US007609855B2

(12) United States Patent
Sada et al.

(10) Patent No.: US 7,609,855 B2
(45) Date of Patent: Oct. 27, 2009

(54) METHOD OF ANALYZING MOVING OBJECTS USING A VANISHING POINT ALGORITHM

(75) Inventors: Jason Sada, Scottsdale, AZ (US);
Ping-Sing Tsai, McAllen, TX (US);
Todd Meijome, Mesa, AZ (US)

(73) Assignee: Object Prediction Technologies, LLC, Scottsdale, AZ (US)

( * ) Notice: Subject to any disclaimer, the term of this patent is extended or adjusted under 35 U.S.C. 154(b) by 577 days.

(21) Appl. No.: 11/290,317

(22) Filed: Nov. 30, 2005

(65) Prior Publication Data

US 2006/0132487 A1     Jun. 22, 2006

Related U.S. Application Data

(60) Provisional application No. 60/632,180, filed on Nov. 30, 2004.

(51) Int. Cl.
*G06K 9/00*     (2006.01)
*H04N 5/225*     (2006.01)

(52) U.S. Cl. ....................................... 382/103; 348/169

(58) Field of Classification Search ........................ None
See application file for complete search history.

(56) References Cited

U.S. PATENT DOCUMENTS

| | | | |
|---|---|---|---|
| 5,890,906 A | 4/1999 | Macri |
| 6,183,259 B1 | 2/2001 | Macri |
| 6,220,865 B1 | 4/2001 | Macri |
| 6,722,888 B1 | 4/2004 | Macri |

(Continued)

FOREIGN PATENT DOCUMENTS

CA     2444492     11/2001

OTHER PUBLICATIONS

Chung, et al., "A Novel Quadrilateral-based Tracking Method," Control, Automation, Robotics and Vision, 2002. ICARCV 2002. 7th International Conference on vol. 1, Dec. 2-5, 2002 pp. 282-285 vol. 1.*

*Primary Examiner*—Charles Kim
(74) *Attorney, Agent, or Firm*—Etherton Law Group, LLC; Sandra L. Etherton; Benjamin D. Tietgen

(57) ABSTRACT

A process of video capture, segmentation, tracking, and mapping to obtain position and time data for motion analysis. The moving object is captured in video in a series of frames at a known frame rate. The moving object is isolated from all other data in a frame and the position of the moving object is determined relative to stationary reference elements in the frame. However, the video captures a physical, three-dimensional space, in a two-dimensional image, causing distortions. This method associates all points in the quadrilateral with a rectangle defined by sides in real, physical space using a vanishing point algorithm.

The preferred vanishing point algorithm maps a physical space to a quadrilateral defined by two sides that intersect at a first vanishing point, and two other sides that intersect at a second vanishing point. Single-point or three-point perspective may also be employed. Once associated, the position in the quadrilateral can be translated to Cartesian coordinates in the rectangle, thereby permitting the accurate determination of an object's position in physical space from a two-dimensional image. The algorithm correlates the midpoint on a side of the quadrilateral from the frame to the midpoint on a side of the rectangle in physical space.

8 Claims, 11 Drawing Sheets

U.S. PATENT DOCUMENTS

| | | | |
|---|---|---|---|
| 2003/0179294 A1* | 9/2003 | Martins | 348/157 |
| 2004/0063084 A1 | 4/2004 | Macri | |
| 2005/0048453 A1 | 3/2005 | Macri | |
| 2005/0179688 A1* | 8/2005 | Chernichenko et al. | 345/427 |

* cited by examiner

| 0 | 0 | 0 | 0 | 0 | 0 | 0 | 0 | 0 |
|---|---|---|---|---|---|---|---|---|
| 0 | 0 | 0 | 0 | 0 | 0 | 0 | 0 | 0 |
| 0 | 0 | 1 | 1 | 1 | 1 | 1 | 0 | 0 |
| 0 | 0 | 1 | 0 | 0 | 0 | 1 | 0 | 0 |
| 0 | 0 | 1 | 0 | 0 | 0 | 1 | 0 | 0 |
| 0 | 0 | 1 | 0 | 0 | 0 | 1 | 0 | 0 |
| 0 | 0 | 1 | 1 | 1 | 1 | 1 | 0 | 0 |
| 0 | 0 | 0 | 0 | 0 | 0 | 0 | 0 | 0 |
| 0 | 0 | 0 | 0 | 0 | 0 | 0 | 0 | 0 |

Figure 2a

| 0 | 0 | 0 | 0 | 0 | 0 | 0 | 0 | 0 |
|---|---|---|---|---|---|---|---|---|
| 0 | 1 | 1 | 1 | 1 | 1 | 1 | 1 | 0 |
| 0 | 1 | 1 | 1 | 1 | 1 | 1 | 1 | 0 |
| 0 | 1 | 1 | 1 | 1 | 1 | 1 | 1 | 0 |
| 0 | 1 | 1 | 1 | 0 | 1 | 1 | 1 | 0 |
| 0 | 1 | 1 | 1 | 1 | 1 | 1 | 1 | 0 |
| 0 | 1 | 1 | 1 | 1 | 1 | 1 | 1 | 0 |
| 0 | 1 | 1 | 1 | 1 | 1 | 1 | 1 | 0 |
| 0 | 0 | 0 | 0 | 0 | 0 | 0 | 0 | 0 |

Figure 2b

| | | | | | | |
|---|---|---|---|---|---|---|
| 0 | 0 | 0 | | 0 | 0 | 0 |
| 0 | *p* | | => | 0 | a | |

(a)

| | | | | | | |
|---|---|---|---|---|---|---|
| 0 | 0 | 0 | | 0 | 0 | 0 |
| a | *p* | | => | a | a | |
| a | 0 | 0 | | a | 0 | 0 |
| 0 | *p* | | => | 0 | a | |
| 0 | a | 0 | | 0 | a | 0 |
| 0 | *p* | | => | 0 | a | |
| 0 | 0 | a | | 0 | 0 | a |
| 0 | *p* | | | 0 | a | |

(b)

| | | | | | | | |
|---|---|---|---|---|---|---|---|
| 0 | b | 0 | | 0 | b | 0 | |
| a | *p* | | => | a | a | | (a == b) |

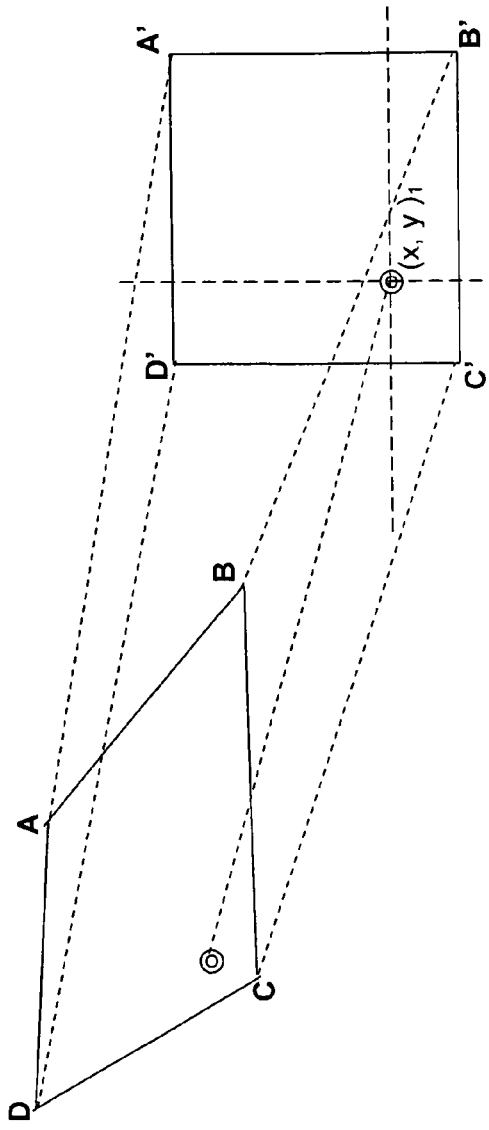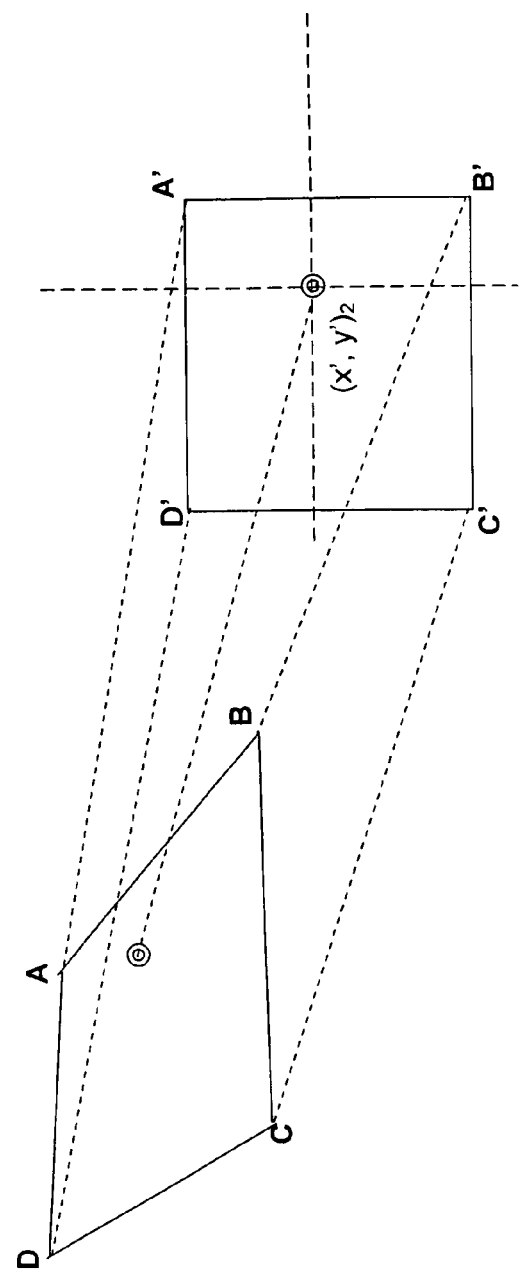

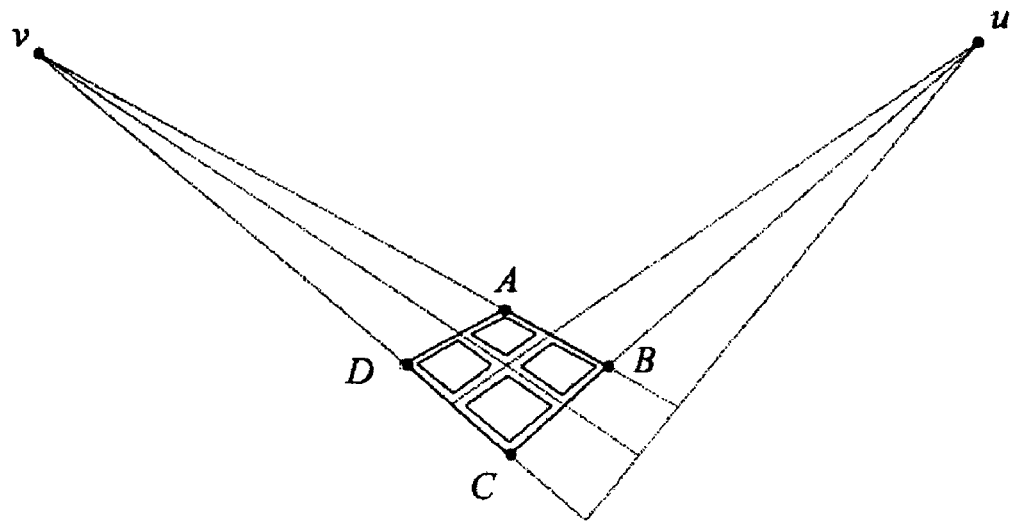
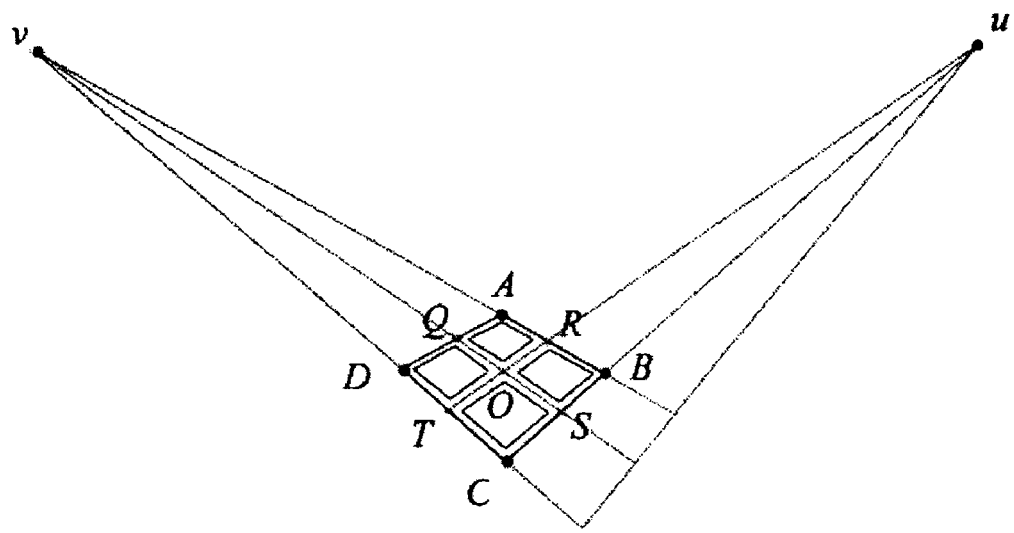
Figure 11

METHOD OF ANALYZING MOVING OBJECTS USING A VANISHING POINT ALGORITHM

CROSS-REFERENCE TO RELATED APPLICATIONS

This application claims the benefit of U.S. Provisional Application No. 60/632,180 filed Nov. 30, 2004, which is incorporated by reference herein.

FIELD OF INVENTION

This invention relates generally to tracking moving objects captured in video and performing motion analysis on these objects.

BACKGROUND

Video recordings of live events are now commonplace: sporting events, gamblers in casinos at the various gaming tables, shoppers in stores, passengers moving through airports and bus terminals, etc. Most frequently the recorded data is analyzed only visually by the viewer, either as the event is taking place, or later, for example after a theft has taken place from a store. Sporting events are recorded and played back by coaches and players for analysis of athletic form. For example, football training camps are recorded on video and played back to evaluate individuals' skills and play execution. It would be useful to be able to analyze the data systematically by methods other than simply viewing the video.

Sometimes individual frames of the video are printed, providing an image of one moment in time over a period of motion. The prior and post action cannot be seen in the single image. It would be desirable to simultaneously show multiple moments in time on a single image.

It is also desirable to determine the velocity or acceleration of an object. For example, in an effort to determine how quickly an athlete moves from one position to another, a coach uses a stopwatch to time the athlete from start to finish. However, stopwatch measurements can be inaccurate. It would be desirable to accurately determine velocity and acceleration from a video recording, especially in the event the athlete cannot be easily timed while performing, for example in a game situation.

SUMMARY OF THE INVENTION

The present system provides a method of analyzing the motion of one or more objects. The preferred embodiment of the present system uses a process of video capture, segmentation, tracking, and mapping to obtain position and time data. The data are analyzed to determine the desired motion information about the object, such as velocity and acceleration.

The moving object is captured in video in a series of frames at a known frame rate. The moving object is isolated from all other data in a frame and the position of the moving object is determined relative to stationary reference elements in the frame. The position of the moving object in the video is translated to a position in physical space utilizing a vanishing-point algorithm. The process is repeated for multiple frames. The distance the object has moved from one frame to the next is calculated from the difference between the position in the first frame and the position in the second frame.

The video captures a physical, three-dimensional space, in a two-dimensional image, causing distortions. For example, parallel lines in physical space appear to converge in a video frame. So, a rectangle in a physical space looks like a quadrilateral in a video frame. It follows, then, that all points in a quadrilateral can be associated with a rectangle defined by sides in real, physical space.

The preferred vanishing point algorithm maps a physical space to a quadrilateral defined by two sides that intersect at a first vanishing point, and two other sides that intersect at a second vanishing point. Once associated, the position in the quadrilateral can be translated to Cartesian coordinates in the rectangle, thereby permitting the accurate determination of an object's position in physical space from a two-dimensional image. The algorithm may instead use one-point perspective in which the quadrilateral will have only two edges parallel to each other, in which the second vanishing point can be considered to be at an infinitely far away location. The vanishing point algorithm takes advantage of the fact that the midpoint on a side of a quadrilateral can always be associated with a midpoint on the rectangle, such that the midpoint of a side of the quadrilateral from the frame is correlated with a point on a rectangle in physical space.

The method allows any desired information about the object's movement to be obtained, provided the desired information can be determined from position and time. The method has particular applicability to sports, casino monitoring, traffic control, security and kinetic studies.

BRIEF DESCRIPTION OF THE DRAWINGS

FIG. 2a is an original image before a simple binary dilation operation.

FIG. 2b is an image after simple binary dilation operation on the original by one pixel.

FIG. 3 illustrates 8-neighborhood connected components labeling.

FIG. 4a is a schematic illustration of a single frame at a first time.

FIG. 4b is a schematic illustration of the single frame at a second time.

FIG. 11 illustrates the steps of subdividing the quadrilateral to contain the point of interest in a smaller quadrilateral.

DETAILED DESCRIPTION OF THE INVENTION

The present invention is used to extract, position, time, and direction data from a video recording of a real event occurring in real, three-dimensional space, referred to herein as physical space. The present invention accomplishes this using a process of video capture, segmentation, tracking, mapping, data consolidation and analysis.

Figure 1:
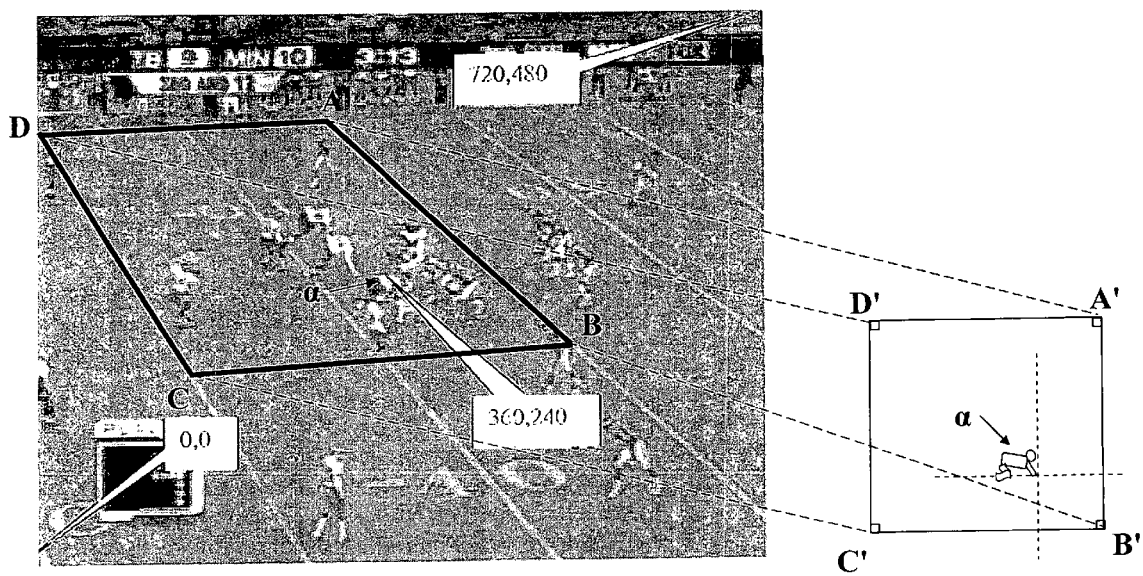
FIG. 1 is a single frame from a video of a football game showing how a quadrangle in the frame translates to a rectangle in physical space

A video is recorded of a desired moving object moving in physical space by methods known in the art. FIG. 1 shows a single frame from a video of a football game. As used herein, video means the stored electronic signals that represent moving images over time. The signals may be analog or digital, in a compressed or uncompressed format. Preferably the video comprises a series of frames taken over time, where each frame represents a set of data for a given moment in time such that frames put together, one after another, simulate motion. A video can be transmitted at a rate specified by number of frames per second or the amount of time between switching frames, both referred to herein as the frame rate. Video is commonly transmitted to a monitor or television to be displayed for human viewing, but the invention herein can operate solely on the stored electronic signals. Visual display is preferred but not necessary.

Once the movement is captured in video, the object of interest is isolated from other objects in the video. This process is referred to herein as segmentation. In general, a region of interest is selected that is constant across the series of frames. The moving object is located within the region of interest and the region of interest can be in any shape but is preferably a quadrilateral. Data outside the region of interest are not processed, leaving only the region of interest to help reduce processing time. Data regarding stationary objects in the region of interest are also removed using a process known in the art as background subtraction. In addition to non-processed data outside the region of interest, static data within the region of interest are subtracted out. Individual frames of the video are compared and the data that does not change is removed. The data remaining after the background has been subtracted out describes the moving object.

Methods of background subtraction are known in the art. One of the simplest background subtraction techniques is to calculate an average image of the scene with no moving objects, subtract each new frame from this image, and threshold the result. More complex methods inlcude that discussed in the paper by G. R. Bradski and J. W. Davis entitled "Motion segmentation and pose recognition with motion history gradients." The preferred embodiment uses binary silhouette-based image approach based on color and luminosity differences, as explained in more detail below. In general, a binary silhouette image is generated for a single frame. A filter is applied to the region of interest to mask out the background. Connected components labeling is applied for object detection and an object merging procedure is repeated until there is no change in the number of different objects. Object tracking is applied to the isolated object.

Three color channels of the reference image are used for background subtraction. A binary different image is generated based on the maximum difference of the three color channels between the current frame and the reference image. If the difference of a pixel is above the given threshold, the pixel value of the binary different image is set to white, or "1"; otherwise the pixel is set to black, or "0". Then a binary morphology operation is applied to the different image to connect any small regions, which may have become disjoint. The simple binary dilation can be implemented by simply changing any black pixel into white pixel, if it has at least one white neighbor. FIG. 2a shows an image before a simple binary dilation operation, and FIG. 2b shows the same image after the operation is performed. Thus the binary silhouette image is generated.

Subsequently, a simple masking operation is applied to the binary silhouette image to mask out all except the region of interest. Any pixel that is outside the region of interest will be set to zero. Next, a traditional connected components labeling module is applied to the binary image after the region-of-interest masking. Connected component labeling works by scanning an image, pixel by pixel (from top to bottom and left to right) in order to identify connected pixel regions (i.e., regions of adjacent pixels which have the same set of intensity values). The connected components labeling operator scans the image by moving along a row until it comes to a point p (where p denotes the pixel to be labeled at any stage in the scanning process) for which p is white. When this is true, it examines the four neighbors of p that have already been encountered in the scan (i.e., the neighbors (i) to the left of p, (ii) above it, and (iii and iv) the two upper diagonal terms). Based on this information, the labeling of p occurs as follows:

if all four neighbors are 0 (black), assign a new label to p, else if only one neighbor is 1 (white), assign its label to p, else if one or more of the neighbors are 1 (white), assign one of the labels to p and make a note of the equivalences.

Figure 3:
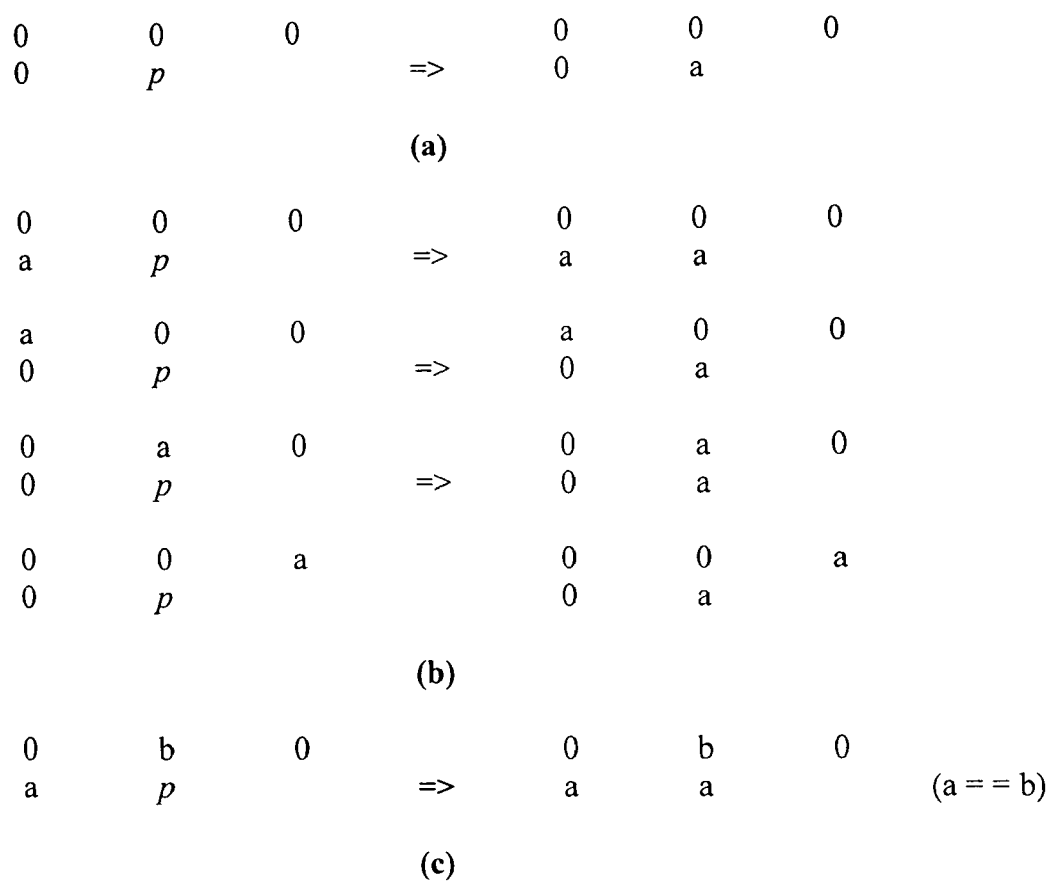

See FIG. 3. After completing the scan, the equivalent label pairs are sorted into equivalence classes and a unique label is assigned to each class. As a final step, a second scan is made through the image, during which each label is replaced by the label assigned to its equivalence classes. The connected components labeling can be implemented recursively. The algorithm is summarized as follows:

Scan the image from left to right, top to bottom;

Find an "unlabeled" pixel with value "1" and assign a new label to it;

Assign recursively all its neighbors with value "1" the same label;

If there are no more unlabeled pixel with value "1" then stop.

Each connected component is considered an object in the frame. The mass center of each object is calculated based on the weighted average of the location of each object pixel. A low-limit for number of object pixels is used to filter out small objects. If the distance between two objects' center is less than certain threshold, then these two objects will be merged as one object. The process will be repeated until the number of objects is unchanged.

The moving object's motion is correlated from frame to frame. For regions of interest having only one moving object, this is straightforward. However, if other moving objects that are not of interest are introduced to the region of interest, their motion must be kept separate from that of the object of interest. For example, assume the object of interest is a football player on a playing field and the region of interest in the video shows the sky in the background. If a jet flies by in the sky, it is a moving object that will be segmented out and yet is uninteresting. So, the motion from the jet must be kept separate from that of the player. This is accomplished by correlating the motion of the player from frame to frame so that it is not co-mingled with the motion of the jet. To track the moving object and eliminate unwanted objects, objects are grouped with those in close proximity having similar motion.

Once the moving object is isolated, its position is determined using a vanishing point algorithm. As is known in art and geometry, receding parallel lines will appear to converge at a point on the horizon, known as the vanishing point. This fact of nature allows two-dimensional images such as paintings and video to convey three-dimensional distance. For example, to create and illusion in a painting that a train is coming out of the painting towards the viewer, the engine of the train would be significantly larger than the caboose, although in physical space the engine and caboose are approximately the same size.

The video captures a physical, three-dimensional space, in a two-dimensional image, causing distortions. For example, parallel lines in physical space appear to converge in a video frame. So, a rectangle in a physical space looks like a quadrilateral in a video frame. It follows, then, that all points in a quadrilateral can be associated with a rectangle defined by sides in real, physical space.

To determine the position of an object in physical space from a video frame, the object's position must be correlated from the video to the physical space, taking into account the effect of the perspective projection. Due to the nature of the vanishing points, a given distance in the physical space correlates to different distance in mathematical coordinates, depending on the position of the object with respect to the vanishing point. This would seem to make it more difficult to determine the distance in the video that an object travels, because a measurement in the video does not give an accurate distance in physical space.

However, the location of any point lying on a plane in a two-dimensional image, such as a video frame, can be identified in physical space by mapping a quadrilateral on the frame to a rectangle on the plane in the physical space. See FIGS. 1, 4a and 4b. The position of the object in the frame is defined by coordinates referred to herein as "mathematical coordinates" and the object in physical space is defined by coordinates referred to as "physical coordinates". Thus, the vanishing point algorithm maps a quadrilateral to a square.

The dimensions of the quadrilateral in the frame are determined by selecting stationary reference elements in the physical space to define the boundaries of the quadrilateral. Stationary references are chosen such that the distance between them can be accurately determined in physical space, preferably by selecting elements with known spacing or by taking physical measurements at the space. The relationship between the position in the frame and the position in physical space can be calculated using trigonometry, using right triangle measurements and ratios. The computational power and time required for such calculations is significant, however. Instead, the preferred embodiment uses a simpler method relating the midpoints of corresponding lines in the quadrilateral and in the physical space, as explained in more detail below.

To facilitate understanding of the invention, a football field is used as the desired physical space. See FIG. 1. The 45 yard line, indicated as A-B, determines the first side of the quadrilateral. The 35 yard line, indicated as C-D, determines the second side of the quadrilateral. The sideline, indicated as A-D, determines the third side of the quadrilateral, and the hash marks, indicated as B-C, indicate the fourth side of the quadrilateral. None of the sides in this quadrilateral are equal in length or orientation, and none of the angles between the sides are 90°.

Figure 5:
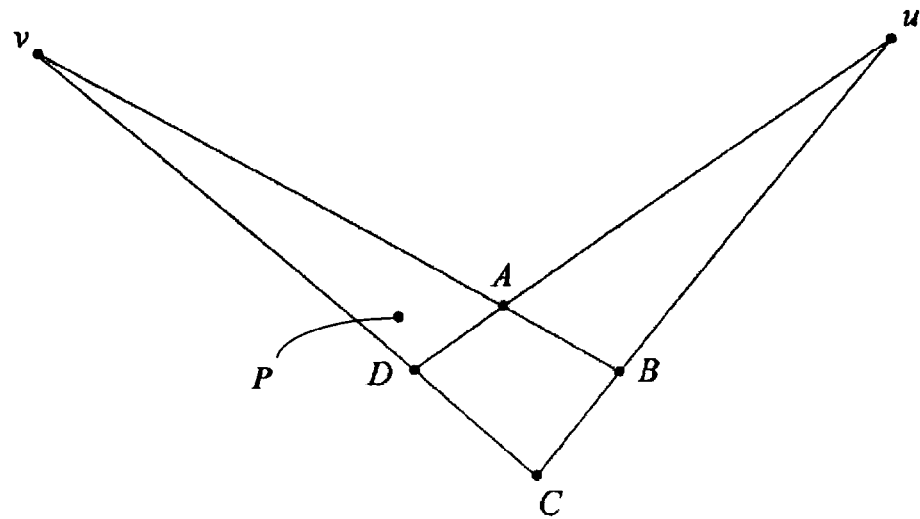
FIG. 5 illustrates a quadrilateral using two vanishing points.
Figure 6:
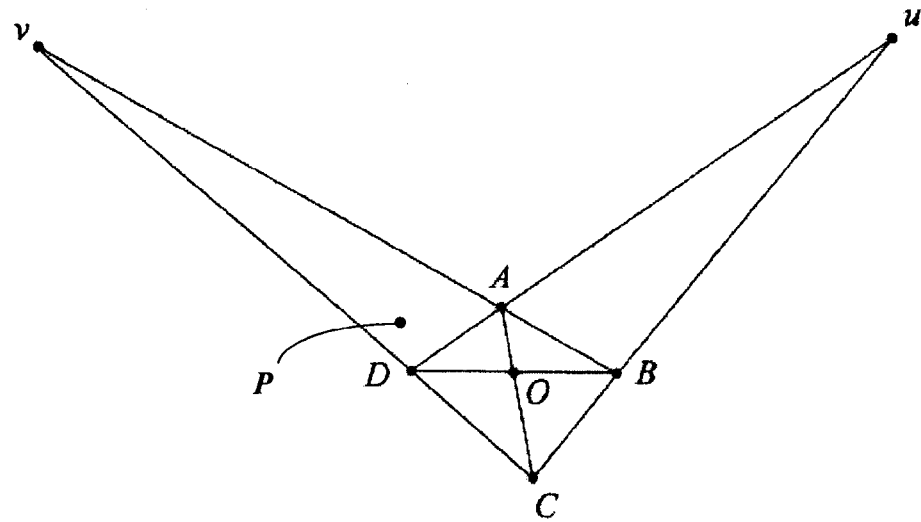
FIG. 6 illustrates the quadrilateral's diagonals and center point using two vanishing points.
Figure 7:
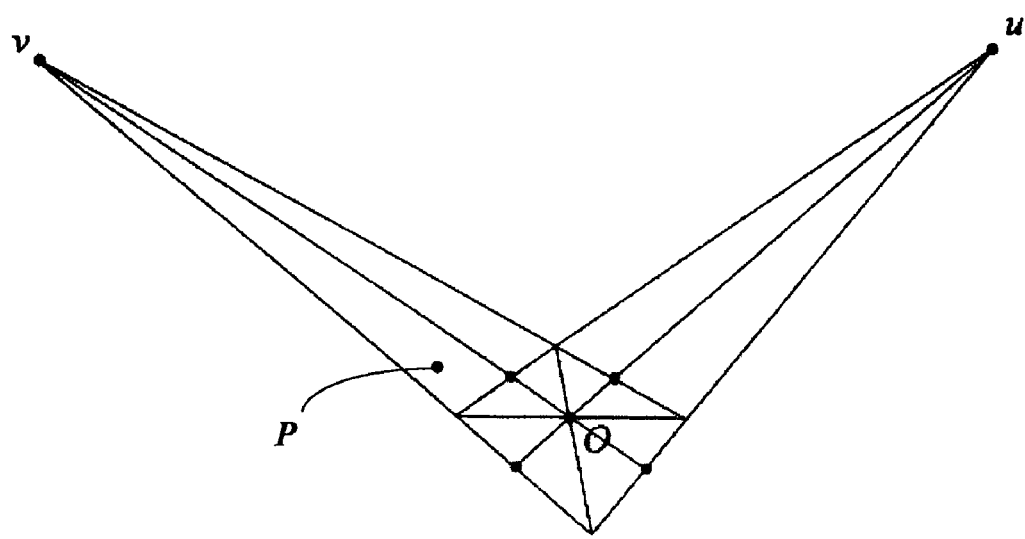
FIG. 7 illustrates the two-point quadrilateral's midpoints using two vanishing points.
Figure 8:
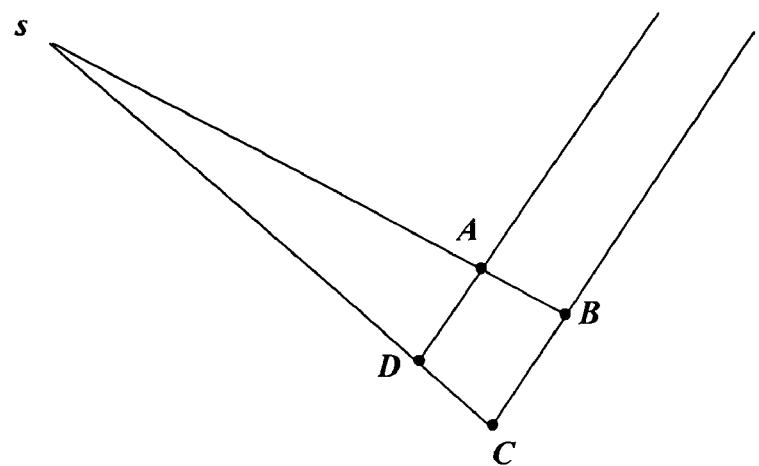
FIG. 8 illustrates a quadrilateral using a single vanishing point.
Figure 9:
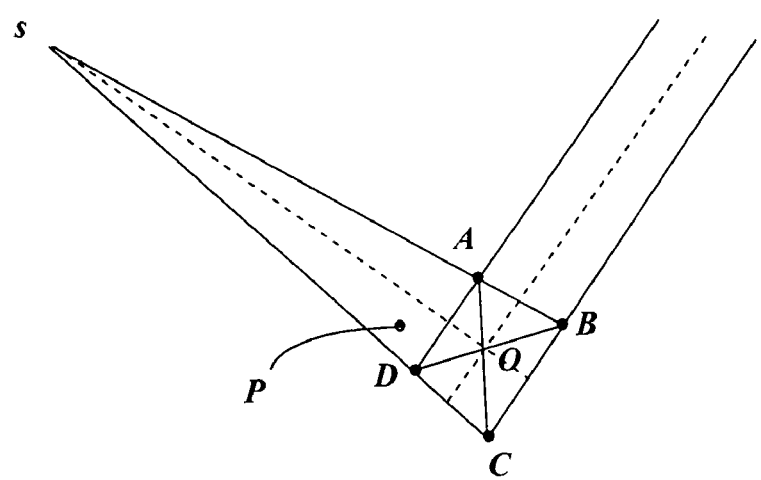
FIG. 9 illustrates the quadrilateral's diagonals and center point using a single vanishing point.
Figure 10:
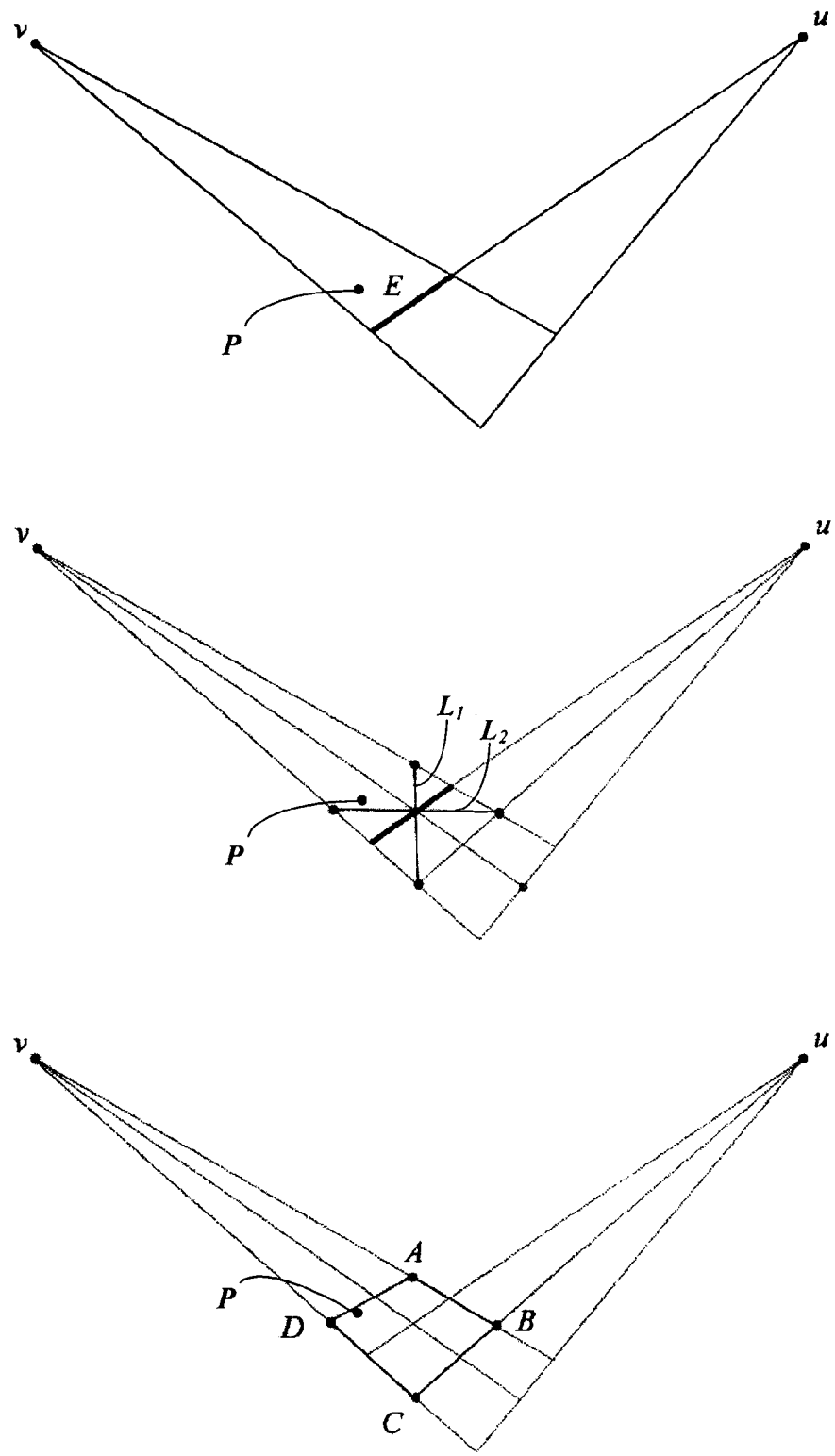
FIG. 10 illustrates the steps of shifting the quadrilateral to contain the point of interest within the quadrilateral.

Once the coordinates of the quadrilateral in the two-dimensional plane are determined, they can be mapped to analogous points in the physical plane, for example the football field. The quadrilateral's similarly oriented edges are extended until they intersect. These intersections are the vanishing points u and v. See FIG. 5. The present invention can also be applied in one-point perspective system, where two sides of the quadrilateral are parallel to each other and only one vanishing point will be used. See FIGS. 8 and 9. In the one-point quadrilateral, two of the quadrilateral's similarly oriented edges are extended until they intersect at vanishing point s. The second vanishing point can be considered at an infinitely far away location. Instead of using the second vanishing (v) and the center point (O) to form the second axis, the second axis will be formed by the line passes through the center point (O) but parallel to the two edges. All the remaining x and y measurements will be the same as in the two-point case. Similarly, the present invention can be applied using three vanishing points. The mathematical coordinates are mapped to the physical coordinates by associating points A to A', B to B', C to C' and D to D'.

For example, FIG. 1 shows a football field. The yard lines are stationary reference elements that can be measured in physical space. The distance between each yard line in physical space is 5 yards, so the distance between line A'B' and line C'D' is 30 feet. The midpoint of line AD on the quadrilateral is equivalent to the midpoint on the line A'D' of the rectangle, so the distance from A to the midpoint of line AD is 15 feet. The sideline and hash marks are also stationary reference elements can be measured in physical space; the distance between the line A'D' and line B'C' in physical space is 89 feet 3 inches. Again, the midpoint of line AB on the quadrilateral is equivalent to the midpoint on the line A'B' of the rectangle, so the distance from A to the midpoint of line AB is 44.625 feet. The quadrilateral can be shifted and subdivided such that the object of interest is located essentially on a midpoint, as described in more detail below, thereby easily determining the object's position in physical space.

Note that the present invention can be applied to any three-dimensional space having stationary features that serve as reference geometries. These spaces include but are not limited to, sports fields (including those other than football), casinos, gaming tables, shopping counters, malls, and city streets.

To further facilitate understanding of the invention, a casino table is used in a second example as the desired physical space. See FIG. 4. A portion of the playing surface where the chips are exchanged has been isolated from video supplied by security cameras, and is referred to as the table. The first side of the table, indicated as A-B, determines the first side of the quadrilateral. The second side of the table, indicated as C-D, determines the second side of the quadrilateral. The third side of the table, indicated as A-D, determines the third side of the quadrilateral, and the fourth side of the table, indicated as B-C, indicates the fourth side of the quadrilateral. None of the sides are necessarily equal in length or orientation.

The quadrilateral defined by ABCD is translated to a square A'B'C'D'. The position of a chip 17 on the table in a first frame is illustrated in FIG. 4a. The physical coordinates of the chip at a first time ($t_1$) are $(x,y)_1$. FIG. 4b shows that the chip has moved. The physical coordinates of the chip at a second time ($t_2$) are $(x,y)_2$. The difference between position $(x,y)_1$ and position $(x,y)_2$ is the distance the chip traveled in the time between $t_1$ and $t_2$.

For accuracy, precision, and speed, it is desirable to choose a quadrilateral that is easily defined by reference elements. However, sometimes the object of interest may not be in the most-easily defined quadrilateral. If the object of interest is not inside the given quadrilateral, the quadrilateral must be shifted along the horizontal or vertical axes, or both, until it surrounds the object of interest. The quadrilateral can be shifted in any direction, but for purposes of illustration, the figures show a quadrilateral being shifted to the left. FIGS. 5-7 and 10-11 show the process using the system with two vanishing points. The process to shift the quadrilateral to contain the object of interest is:

Determine the center point O of the quadrilateral. The center point O is the intersection point of the quadrilateral's diagonals. See FIG. 6.

Determine the midpoint of each edge. Each edge's midpoint is the intersection of that edge with the line that passes through the vanishing point u and O or v and O. These midpoints will help form the shifted quadrilateral. See FIG. 7.

In this step, the quadrilateral begins its shift toward the point of interest. The edge of the quadrilateral nearest the point of interest will be referred to as the edge E. Find the line $L_1$ that passes through the midpoint of edge E and the midpoint of one of its adjacent edge. Find the intersection point of $L_1$ and the adjacent edge. This will be the third point to help form the shifted quadrilateral.

Repeat the previous step, but swap the adjacent edges to find the line $L_2$ that passes through the midpoint of edge E and the midpoint of one of other adjacent edge. Find the intersection point of $L_2$ and the adjacent edge. This will be the fourth point to help form the shifted quadrilateral.

Adjust the mappings to reflect the shift.

Repeat the steps until the point of interest is inside the quadrilateral.

If the quadrilateral is small enough, it will accurately indicate the position of the object of interest. However, for increased accuracy, the quadrilateral can be subdivided. The smaller the quadrilateral, the more accurate the position of the object within it is determined. The accuracy of the method depends on the level of subdivision that occurs. For more accurate mappings, the subdivision can be repeated until the area of the resulting quadrilaterals nears zero.

The process to subdivide the quadrilateral to contain the object of interest is:

Determine the center point O of the quadrilateral. The center point O is the intersection point of the quadrilateral's diagonals See FIG. 6.

Determine the midpoint of each edge. Each edge's midpoint is the intersection of that edge with the line that passes through the vanishing point u and O or v and O.

Form four smaller quadrilaterals out of the corner points, the center point and midpoints (see FIG. 11). Create the mappings for the new quadrilaterals.

Determine which of the new quadrilaterals the point of interest lies in. If more accuracy is desired, subdivide the quadrilateral again.

Each processed frame has a significant amount of information associated with it, including the location of each centroid, the object's mass center, the quadrilateral, multiple objects in the region of interest, etc. In the preferred embodiment the data is consolidated and data is organized into files. Files may be referenced by some index file or concatenated into a single archival file. Organizing and consolidating the information helps facilitate quicker processing with fewer errors.

Positional data is used in combination with frame rate to derive velocity, acceleration and distance. For example, to determine the speed of a football player leaving the line of scrimmage, the grid coordinates of the player's start and finish positions are entered into the computer. Data entry can be input by any known method. The preferred method of data input is clicking a mouse when the cursor overlies the desired position on the monitor. The player's start grid coordinates are subtracted from his finish grid coordinates to determine the distance traveled. The amount of time it took is determined by the number of frames elapsed divided by the video frame rate. The player's speed is determined by dividing the distance by the time. Consequently, the desired metrics are output and used to compare and improve a player's motion.

The metrics are accurate to within Nyquist sampling of the frame rate. So, if a coach using a stopwatch makes an error on starting or stopping the stopwatch of more than $\frac{1}{30}^{th}$ of a second, the present process is more accurate.

For manual analysis, the video data is supplied to a receiver and the image with the quadrilateral is displayed on a monitor. The row and column coordinates on the monitor relate to specific positions on the football field. For convenience, the two-dimension grid coordinates are the row and column coordinates of the pixels of the monitor. In other words, each set of pixel coordinates on the monitor translates to a specific position on the football field. For example in FIG. 1, using the origin (0,0) as indicated, player a is at pixel grid position (360, 240) on the monitor, translating to the 42.12 yard line and 26.49 yards from the origin, respectively.

However, the preferred embodiment is automated. The video data is supplied to a receiver and the quadrilateral reference image is calculated digitally and recorded. The two-dimension grid coordinates are simply x,y arithmetic coordinates. No visual monitor is needed. The resultant coordinate table that consolidates desired three-dimensional space to the two-dimensional map coordinates is a tangible result used for determination of position.

Figure 12:
FIG. 12 illustrates ghosting.

Another result of the present device is the ability to extract the motion data and simultaneously show multiple positions in time on a single image. FIG. 12 shows a schematic illustration of ghosting, which is used to visually depict the object's motion and acceleration. The single image captured from a still position of the moving object is stacked next to the captured still position of the moving object detected next in time. The stills collected on the single output thereby simultaneously show multiple positions over time. The closer the images are stacked together indicates a slower period of acceleration.

Figure 13:
FIG. 13 illustrates stop framing.

FIG. 13 shows a schematic illustration of stop framing, which is used to visually depict the distance traveled in a given period of time. The single image captured from a still position of the moving object is stacked next to another captured still position of the moving object detected later in time. The single image then simultaneously shows multiple positions over a period of time. The closer the images are stacked together indicates a smaller distance traveled for a given period of time.

While there has been illustrated and described what is at present considered to be a preferred embodiment of the present invention, it will be understood by those skilled in the art that various changes and modifications may be made, and equivalents may be substituted for elements thereof without departing from the true scope of the invention. Therefore, it is intended that this invention not be limited to the particular embodiment disclosed as the best mode contemplated for carrying out the invention, but that the invention will include all embodiments falling within the scope of the appended claims.

We claim:

1. A method of performing motion analysis on a moving object comprising:
   using a computer to perform steps comprising:
   a) recording movement of the object in video at a frame rate, the video comprising at least a first frame and second frame;
   b) isolating the object from background data in at least the first frame and the second frame;
   c) in the first frame, containing the object in a quadrilateral having mathematical coordinates A, B, C and D, where:
      i. the side defined by A-B and the side defined by C-D, if extended, would intersect at a first vanishing point u; and
      ii. the side defined by A-D and the side defined by C-B, if extended, would intersect at a second vanishing point v;

d) determining a rectangle in physical space having physical coordinates A', B', C' and D,' where:
   i. the side defined by A'-B' and the side defined by C'-D' are parallel;
   ii. the side defined by A'-D' and the side defined by C'-B' are parallel;
e) associating the quadrilateral with the rectangle such that a first point on a side in the quadrilateral defines a physical location defined by a corresponding point on a corresponding side in the rectangle;
f) determining the physical location of the object contained by the quadrilateral by associating the mathematical coordinates of the quadrilateral to the physical coordinates of the rectangle;
g) repeating steps c-f for the object in the second frame; and
h) recording the distance the object traveled as the difference between the physical location of the object in the first frame and the physical location of the object in the second frame.

2. The method of claim 1 wherein the first point on the side in the quadrilateral is the midpoint of that side and the corresponding point on the corresponding side in the rectangle is the midpoint of that side of the rectangle.

3. The method of claim 1 further comprising:
a) determining the time elapsed between the first frame and the second frame from the frame rate;
b) dividing the distance the object traveled by the time elapsed; and
c) recording the result as the velocity of the object.

4. A method of determining the acceleration of an object comprising:
a) using a first frame and a second frame of a video to determine a first velocity of an object from the method of claim 3;
b) using the second frame and a third frame of the video to determine a second velocity of the object from the method of claim 3;
c) obtaining the difference between the first velocity from the second velocity and dividing that distance by the time elapsed; and
d) recording the result as the acceleration of the object.

5. The method of claim 1 wherein containing the object further comprises subdividing the quadrilateral to achieve a desired accuracy.

6. The method of claim 1 wherein containing the object further comprises shifting the quadrilateral to achieve a desired accuracy.

7. The method of claim 1 wherein the physical space is an athletic field.

8. The method of claim 1 wherein recording the movement of the object in video comprises storing the video in a storage medium selected from the group consisting of: magnetic tape; a magnetic disk; an optical disk; and a microchip.

* * * * *